Feb. 15, 1949.  T. R. KOMLINE  2,461,824
CONTINUOUS ROTARY DRUM FILTER
Filed Feb. 10, 1947
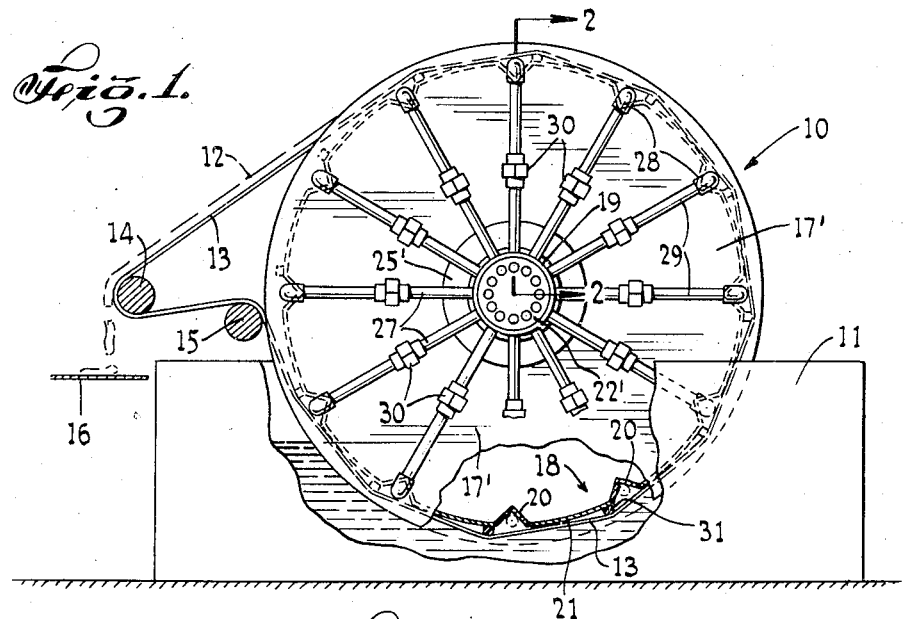
Fig. 1.
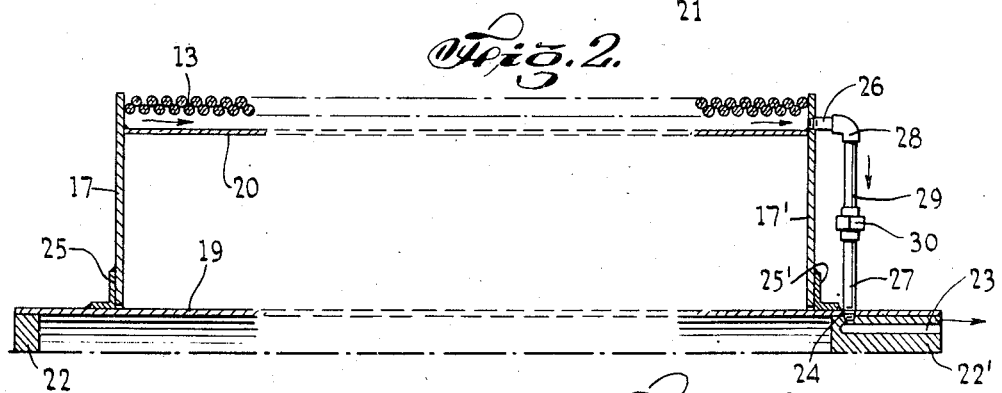
Fig. 2.
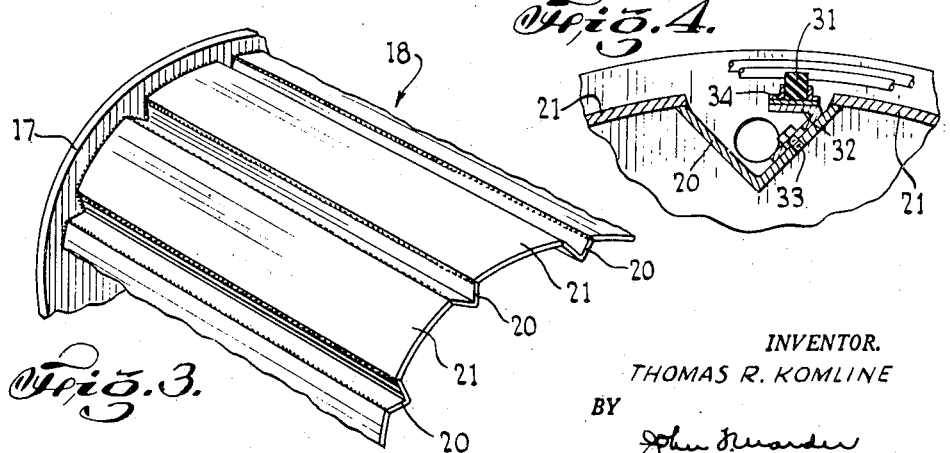
Fig. 3.
Fig. 4.
INVENTOR.
THOMAS R. KOMLINE
BY
*John Alexander*
AGENT Patented Feb. 15, 1949

2,461,824

UNITED STATES PATENT OFFICE 2,461,824

CONTINUOUS ROTARY DRUM FILTER

Thomas R. Komline, Glen Rock, N. J., assignor to Komline-Sanderson Engineering Corporation, Ridgewood, N. J., a corporation of New Jersey Application February 10, 1947, Serial No. 727,589

4 Claims. (Cl. 210—199)

This invention relates to improvements in continuous rotary vacuum filters. Its particular application exists in connection with filter drums for separating solids from suspension in a liquid, as in municipal sewage sludge filtration plants, although it is by no means limited to this use but is equally adaptable to filtration units which are employed for industrial processing.

A continuous drum filter for sewage or for industrial treatment represents a comparatively large piece of mechanical equipment. The material to be filtered is stored in a large vat or tank and a cylindrical drum is rotatably mounted above the tank and partially submerged therein, to continuously draw solids to its filtering surface, carry the effluent therethrough and discharge both the solids and the filtered liquid. In order to fabricate such a sizable machine it is necessary to resort to unusually large machine tools. This fact may be appreciated when we consider that filter drums may be approximately 8 feet in diameter. If engine turning is required on drum heads or surfaces, an extremely large lathe must be used and likewise, if trunnions are closely fitted through the drum heads in the usual manner, large boring tools are necessary as a supplement to the substantial sized lathe equipment.

In the application of parallel strands of endless cord as a filter medium over the drum on a continuous vacuum type drum filter, the cords as a filter element may rest in overlapping relationship on a smooth cylindrical drum surface and drainage will take place circumferentially of the drum along and under the cords. The accumulation of filtered effluent circumferentially of the drum may then be directed longitudinally of the drum along a narrow path adjacent to and co-extensive with the compartment divisions, where sealing strips raise the cord web slightly above the drum surface. Thus, the use of dual surface layers for compartmentalizing the drums of rotary vacuum filters are not required.

This arrangement for the lay of a filter element on a drum also makes it possible to improve drum construction and it is the primary object of this invention to provide a filter drum which is suitable for use with a cord filter layer and which is structurally improved as compared with filter drums used in the past. Accordingly, I make use of standard sizes and shapes of materials and arrange for their fabrication into a rigid compartmental filter drum, avoiding the necessity for large machine tools. The drum surface of my invention is completely imperforate, provision being made to effectively drain the separated compartments of effluent longitudinally of the drum through the drum heads to the exterior of the drum. In my drum construction I furthermore provide adjustable compartmental sealing strips which co-operate with other elements of my improved filter drum to increase the filter's effectiveness.

Other objects and advantages of the invention relating particularly to the details of construction will become apparent from the following description of the preferred embodiment of the invention read in conjunction with the accompanying drawing in which:

Figure 1 is an end elevation view with parts broken away showing in diagrammatic form a rotary drum filter employing my invention, Figure 2 is a cross-section view through the filter drum on line 2—2 of Figure 1, Figure 3 is a fragmentary perspective view showing a part of the surface of the filter drum of my invention, Figure 4 is an enlarged cross-section view showing a modified sealing strip construction for use with my invention.

As shown in Figure 1 the improved filter drum 10 may be suitably supported for rotation partly submerged in a tank 11 containing a suspension of solids in a liquid to be filtered. The direction of rotation of the drum is counter-clockwise so that the accumulation of filter cake 12 which is carried away from the drum on the cord filter web 13 may be discharged therefrom as element 13 reverses its direction over discharge roller 14. The cords of web 13 are then returned to and retrained about the drum over a guide roller 15. As the filter cake drops away from web 13 over the discharge roller it is carried away by a suitable belt conveyor 16.

Referring to Figure 2, drum 10 generally consists of a pair of companion drum heads 17, 17' between which is a grooved barrel portion 18. Central of the heads 17, 17' and extending continuously through the drum is the hollow tubular trunnion 19 which protrudes a sufficient distance beyond the drum heads to provide for axial support for the drum during rotation. Heads 17, 17' are constructed as flat metal discs which may conveniently be burned out of heavy boiler plate by the use of an acetylene torch or in any other suitable manner with clearance holes to accommodate the hollow drum trunnion 19. Finishing operations subsequently applied thereto consist merely of such filing and straightening as is required to arrive at a finished part for the application from an appearance standpoint.

Angle iron troughs 20, see Figure 3, are welded or otherwise fixed and sealed between the inner surfaces of the drum heads longitudinally of the drum at predetermined locations corresponding to the vacuum compartment spacing employed in the design of the filter, and they are radially located short of the outside diameter of drum heads 17, 17' with the V of the angle iron form directed toward the drum center. It is not considered important that rolled or drawn angle shaped troughs be used, but rather, these troughs may also be of a V construction which comprises a welded assembly of two flat pieces, or, the troughs may also be half rounds or channels. The preliminary skeleton assembly of the heads 17, 17' and troughs 20 produces a stable drum framework to which the slightly curved rectangular drum surface plates 21 are then added, as by welding, for web support, with all seams and joints completely closed. If desirable, plates 21 may be flat rather than curved, thus avoiding the necessity of using plate curving equipment.

The drum trunnion 19 is made an integral part of the drum assembly by welding a pair of flanged collars 25, 25' to the heads 17 and 17' and to the trunnion 19 in a suitable welding fixture and included within the open ends of trunnion 19 are pressed-in closure plugs 22, 22' to finish off the ends of the trunnion. Plug 22' on the right hand end, in addition, is drilled axially of the drum with a series of blind openings 23 which are used to communicate with a vacuum valve mechanism and, for each axial opening, a tapped radial opening 24 is provided aligning with a clearance hole in trunnion 19 permitting the installation of a series of pipe nipples 27 therein.

Tapped openings are also provided through drum head 17' at the location of the angle iron troughs 20, and pipe nipples 26 are installed therein to communicate with these troughs and to permit effluent to pass there-through from the trough during filtering. To complete the line of communication between nipples 26 and 27, the elbows 28, nipples 29, and unions 30 are then assembled therewith, thus providing a continuous line of communication outside of the filter drum for withdrawal of the filtered effluent.

Compartment sealing strips 31, Figure 1, are then secured to the drum co-extensive with the drum surface between heads 17, 17' to hermetically separate the sections from each other as is customary with rotary vacuum filters. These are usually made of resilient material such as rubber or neoprene and may be attached by the use of suitable clamps or adhesive. The view shows the sealing strips disproportionately large while in actual practice they are usually relatively small and they are situated adjacent to troughs 20 on the trailing side thereof.

As an alternative, the sealing strips may be made radially adjustable by providing supporting brackets 32, such as the one shown in Figure 4, which may be adjustably fixed within trough 20 by studs 33 to which the formed sealing strip holder 34 is rigidly attached. As the sealing strip becomes worn or deformed by the effects of filter operation, or if the drainage between the cords resting on plates 21 is defective, then the strips may be raised slightly to improve either the vacuum seal or the drainage.

In operation, the web 13 carried by the drum lies in contact with the drum heads during the application of vacuum and thus seals the compartment ends. By reason of the complete closure which is effected at the joints of the troughs, plates and heads, and by the closure formed by the compartmental sealing strips 31 with the web, there is no passage by which effluent may be removed from compartments during the vacuum cycle other than through the nipples and associated piping from drum head 17'. The only irregular line of sealing is the joint formed by the irregular cord configuration and the web sealing strips which is adjustable to compensate for deficiencies due to wear. A minimum of tooling is required and an efficient and structurally rigid drum is provided.

It will be understood that various changes may be made in the construction and the geometrical shape of the drum, for example wooden drum heads and barrel section may be substituted for steel requiring only slight design changes and the use of known techniques for sealed assembly. Likewise fluted or polygonal cross-section may be resorted to in the construction of the barrel portion. The grooves in the barrel portion may be advantageously curved, as in the form of a helix or spiral. Other changes and substitutions may also be resorted to without departing from the invention as outlined in the subjoined claims.

I claim:

1. In a drum for a continuous rotary vacuum filter, in combination, a pair of spaced drum heads, a barrel portion between the heads consisting alternately of grooved sections of web supports, and web sealing strips arranged on supporting brackets disposed within and adjustably projecting from the grooved sections.

2. In a drum for a continuous rotary vacuum filter of the type wherewith a permeable medium is trained about the exterior surface of the drum, in combination, a pair of spaced drum heads and a barrel portion situated between the drum heads in axial alignment therewith, said barrel portion being an imperforate, substantially cylindrical shell, the external surface of which is divided by spaced, longitudinally arranged compartment sealing strips to provide a series of compartmental divisions, each compartmental division of said shell having a convex peripheral portion for supporting the permeable medium and having a drainage channel disposed longitudinally of the drum axis adjacent said convex portion over which the filter medium bridges, whereby effluent passing through a filter medium may travel circumferentially of the drum under the medium resting on the drum surface to the drainage channel and thence axially of the drum in the drainage channel.

3. In a drum for a continuous rotary vacuum filter of the type wherewith a permeable medium is trained about the exterior surface of the drum, in combination, a pair of spaced drum heads and a barrel portion situated between the drum heads in axial alignment therewith, said barrel portion being an imperforate, substantially cylindrical shell, the external surface of which is divided by spaced, longitudinally arranged compartment sealing strips to provide a series of compartmental divisions, each compartmental division of said shell having a convex peripheral portion for supporting the permeable medium and having a drainage channel disposed longitudinally of the drum axis adjacent said convex portion over which the medium bridges whereby effluent passing through a filter medium may travel circumferentially of the drum under the medium resting on the drum surface to the drainage channel and thence axially of the drum in the drainage channel, one of said drum heads being provided with effluent outlets in registration with the drainage channels for passage of effluent from the drainage channels.

4. In a drum for a continuous rotary vacuum filter of the type wherewith the permeable medium is trained about the exterior surface of the drum, in combination, a pair of spaced drum heads and a barrel portion situated between the drum heads in axial alignment therewith, said barrel portion being an imperforate, substantially cylindrical shell, the external surface of which is divided by spaced, longitudinally arranged compartment sealing strips to provide a series of compartmental divisions, each compartmental division of said shell providing a convex peripheral portion for supporting the permeable medium having a drainage channel disposed longitudinally of the drum axis adjacent said convex portion over which the medium bridges whereby effluent passing through a filter medium may travel circumferentially of the drum under the medium resting on the drum surface to the drainage channel and thence axially of the drum in the drainage channel, said drum heads being each provided with axial rotation supporting trunnions and one of said drum heads being provided with a series of effluent apertures in registration with said drainage channels.

THOMAS R. KOMLINE.

REFERENCES CITED

The following references are of record in the file of this patent:

UNITED STATES PATENTS

| Number | Name | Date |
| --- | --- | --- |
| 746,552 | Moore | Dec. 8, 1903 |
| 1,667,465 | Wait | Apr. 24, 1928 |
| 1,892,306 | Hillier | Dec. 27, 1932 |
| 2,111,843 | Daman | Mar. 22, 1938 |
| 2,247,460 | Wright | July 1, 1941 |

FOREIGN PATENTS

| Number | Country | Date |
| --- | --- | --- |
| 546,591 | Germany | Mar. 16, 1932 |